Nov. 3, 1964
H. L. HULL
3,155,789
FOOT PEDAL FOR DIMMER SWITCHES
Filed Aug. 17, 1961
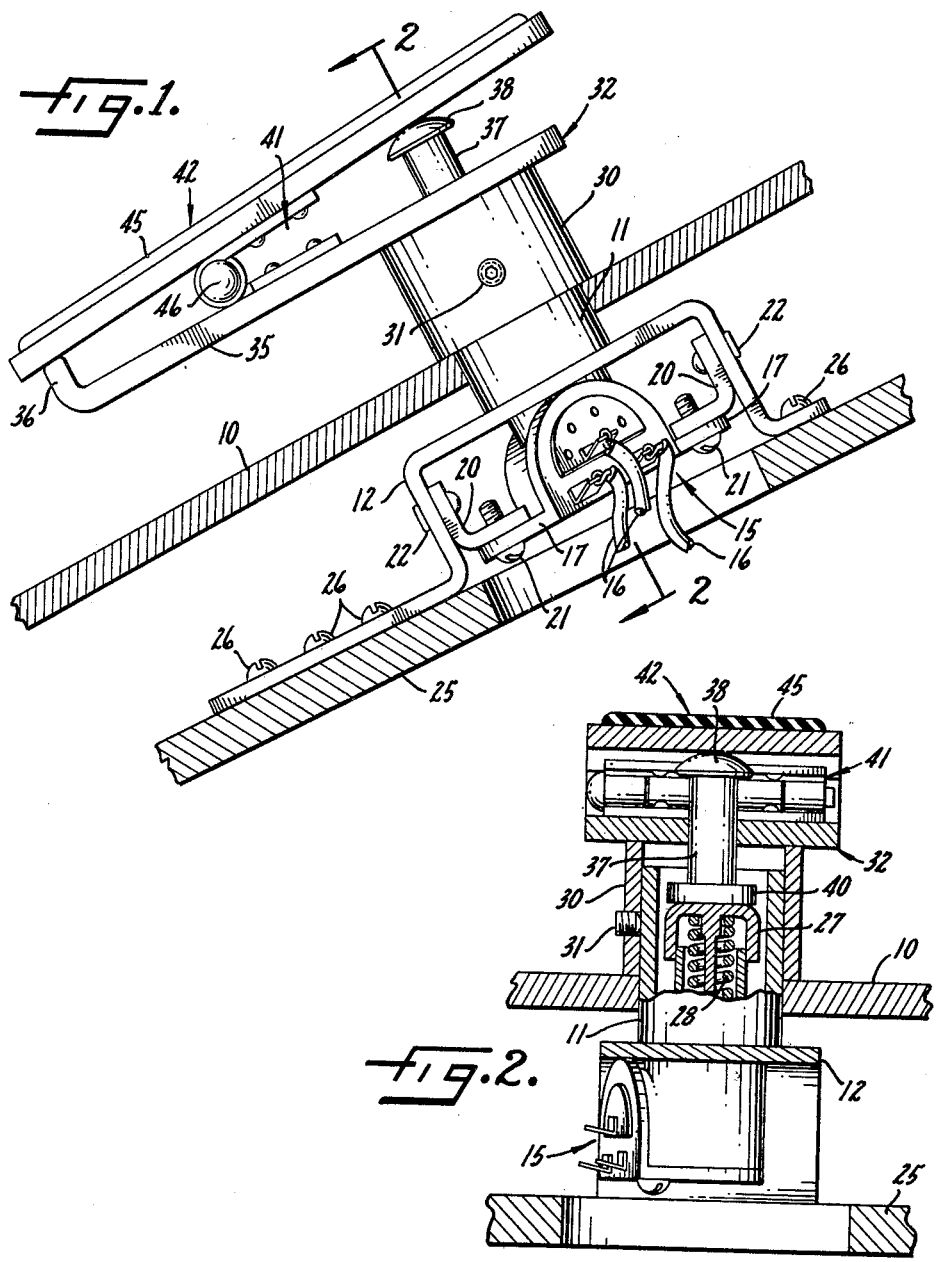
INVENTOR.
Howard L. Hull,
BY
Lockwood, Woodard, Smith & Weikart
Attorneys.

3,155,789
FOOT PEDAL FOR DIMMER SWITCHES
Howard L. Hull, 245 W. 38th St., Apt. 307,
Indianapolis, Ind.
Filed Aug. 17, 1961, Ser. No. 132,221
5 Claims. (Cl. 200—86.5)

The present invention relates to an improved dimmer switch arrangement for use in an automobile.

Practically all present-day automobiles are provided with headlights capable of providing "bright" lights which create illumination for a substantial distance ahead of the automobile and capable of providing "dimmed" lights whereby the beams are directed downwardly away from the eyes of oncoming drivers. Such lighting arrangements are conventionally operated by a foot switch located at the left side of the floor of the driver compartment of the automobile. One problem present in the operation of such conventional dimmer switches is the difficulty of locating the switch, it being understood that the floor board area is dark and the switch must be operated frequently during certain types of highway driving.

Consequently, one object of the present invention is to provide an improved dimmer switch arrangement which is easily located by the driver for operation thereof and does not require taking the eyes off the road.

Another object of the present invention is to provide an improved dimmer switch arrangement constructed to permit resting of the foot thereon at times when the switch is not being operated, one resultant advantage being that the foot need not be moved around in an effort to locate the switch when needed.

A further object of the present invention is to provide an improved dimmer switch arrangement capable of better supporting the weight of a driver's foot being rested thereupon without undesired actuation of the dimmer switch.

Another object of the invention is to provide a dimmer switch easily operated by short persons and ladies wearing high heels.

Related objects and advantages will become apparent as the description proceeds.

One embodiment of the present invention comprises a plate fixed with relation to the floorboard of an automobile and extending rearwardly and downwardly and generally parallel to the floorboard. A pedal is hinged to the plate by a hinge located at the approximate center of the pedal. The upper left forward portion of the pedal engages a dimmer switch pushbutton and the lower rearward portion of the pedal normally rests against an upturned lower end portion of said plate whereby the driver may rest his foot upon said pedal when the dimmer switch is not being operated.

It should be understood, however, that said plate could extend from left to right or right to left with the pushbutton on the left or right, respectively, and the various other parts appropriately relocated. Such an alternative embodiment would be operated by tilting the foot from right to left or vice versa.

The full nature of the invention will be understood from the accompanying drawings and the following description and claims:

FIG. 1 is a side elevation of a dimmer switch arrangement constructed according to the present invention and shown mounted at the floor board of an automobile.

FIG. 2 is a generally vertical section taken along the line 2—2 of FIG. 1 in the direction of the arrows.

Referring more particularly to the drawings, there is illustrated an automobile floor mat 10 through which extends cylinder 11 fixed to a bracket 12. The bracket mounts a conventional dimmer switch 15 having three electrical leads 16 arranged to control the lights of the automobile and to provide bright lights or dimmed lights alternately. The switch 15 is mounted upon the bracket 12 by means of oppositely extending ears 17 integral with the switch housing and fixed to the bracket by means of angles 20, screws 21, and rivets 22. The bracket 12 is fixedly mounted upon the floorboard 25 of the automobile by means of screws 26 extending through suitable apertures in the bracket.

The switch 15 further includes a pushbutton 27 which is resiliently held in an upward position by means of a suitable internal spring 28 forming a part of the conventional dimmer switch 15. This spring normally holds the pushbutton in the illustrated upward nonactuated position but yieldably permits depression of the pushbutton to transfer the automobile headlights from "dimmed" to "bright" or vice-versa. The above described structure with the possible exception of the cylinder 11 is either identical or similar to conventional dimmer switches. For this reason and as will become clear from the description below, a conventional dimmer switch could be easily converted or used with the dimmer switch arrangement of the present invention.

A further cylinder 30 is telescoped over the cylinder 11 and is fixed thereto by means of an Allen-head set screw 31 threadedly received in the wall of the cylinder 30 and engaging the cylinder 11. Fixed to the upper end of the cylinder 30 is a rectangular plate 32 which has a major portion 35 extending downwardly and rearwardly of the automobile in parallel relation to the floorboard 25. The lower end 36 of the plate 32 is upturned as illustrated for a purpose which will become apparent.

Reciprocably mounted within the plate 32 is a piston 37 having an upward rounded, enlarged end 38 and a lower flat enlarged end 40. Positioned between the piston 37 and the upturned end 36 of plate 32 is a hinge 41 (or similar mounting device) which swingably connects the plate 32 to a pedal 42 having a corrugated rubber mat 45 thereon. The spring 28 of the dimmer switch 15 normally retains the push-button 27 in the illustrated upward position wherein the piston 37 is held against the pedal 42 which in turn is held against the upturned portion 36 of the plate 35.

Thus, the driver may rest his foot on the rubber mat 45 whether or not he is operating the dimer switch 15. In fact, considerable force can be exerted against the pedal 42 without dimmer switch actuation as long as the resultant force is on the lower side of the axis 46 of the hinge 41. In other words, the fact that the hinge 41 is located centrally of the pedal permits resting of the foot thereon with little possibility of undesired actuation of the dimmer switch.

When it is desired to operate the dimmed switch, the foot is pivoted forwardly causing the pedal to pivot about the axis 46 of the hinge 41 and causing the piston 37 to depress the push-button 27. After such operation, the foot is returned to the normal resting position and the spring or resilient means of the dimmer switch returns the push-button to projected position, said spring also acting through piston 37 to retain the pedal in the illustrated position abutting the upturned end 36.

From the above description, it will be obvious that the present invention provides an improved dimmer switch arrangement which can be easily located by the driver even though the floorboard area of the automobile is dark. It will also be obvious that the present invention provides an improved dimmer switch arrangement constructed to permit resting of the foot thereon at times when the switch is not being operated, said arrangement also being capable of better supporting the weight of a foot rested thereupon without undesired actuation of the dimmer switch. It can further be seen that the present arrangement is easier to reach by short persons and by ladies wearing high heels.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

For example, one alternative of the invention might include releasing the screw 31, rotating the cylinder 30 until the end 36 extends leftwardly or rightwardly and retightening the screw 31. Such an arrangement would be actuated by tilting the foot from right to left or left to right.

The invention claimed is:

1. A dimmer switch arrangement for an automobile comprising a dimmer switch including a depressable push-button, resilient means yieldably holding said push-button in projected position, said switch being mounted at the floorboard of the automobile, an elongated foot pedal, a support attached to said floorboard and including a portion spaced upwardly of said floorboard, means swingably connecting said pedal to said upwardly spaced portion of said support, said means being connected to said pedal centrally of the length thereof, said upwardly spaced portion of said support including an abutment at one end thereof, said pedal having one longitudinal end portion engaging said abutment and an opposite longitudinal end portion overlying and engaging said push-button.

2. With a dimmer switch including a depressable push-button and resilient means yieldably holding said push-button in projected position, said switch being mounted at the floorboard of the automobile with the push-button projecting upwardly and rearwardly in perpendicular relation to the floorboard, and a cylinder housing said push-button and fixed with relation to said floorboard, the improvement which comprises a further cylinder telescoped over said first cylinder, a set screw threadedly received in the wall of said further cylinder and fixing it to said first cylinder, an elongated rectangular plate fixed to the top of said further cylinder and extending in generally parallel relation to the floorboard of the automobile, a major portion of said plate extending sidewardly away from said further cylinder and having an upturned portion at the extending one longitudinal end thereof, an elongated rectangular pedal sized approximately the same as said plate and in overlying alignment with said plate, a hinge swingably connecting said pedal and plate centrally thereof, a piston reciprocably received through said plate adjacent the other longitudinal end thereof with the opposite ends of the piston engaging said push-button and pedal, each of said opposite ends being enlarged, said resilient means normally urging said pedal upwardly so as to pivot it against said upturned portion.

3. A dimmer switch arrangement for an automobile comprising a dimmer switch including a depressable push-button, resilient means yieldably holding said push-button in projected position, said switch being mounted at the floorboard of the automobile, a rectangular plate fixed with relation to and extending in generally parallel relation to the floorboard of the automobile, a major portion of said plate extending downwardly away from said push-button and having an upturned portion at the lower end thereof, an elongated pedal of approximately the same size as said plate and in overlying alignment with said plate, a hinge swingably connecting said pedal and plate centrally thereof, a piston reciprocably received through said plate with the opposite ends of the piston engaging said push-button and said pedal, said resilient means normally urging said piston upwardly to retain said pedal against said upturned portion.

4. A dimmer switch arrangement for an automobile comprising a dimmer switch including a depressable push-button, resilient means yieldably holding said push-button in projected position, said switch being mounted at the floorboard of the automobile, a cylinder housing said push-button and fixed with relation to said floorboard, a further cylinder telescoped over said first cylinder, a set screw received in the wall of said further cylinder and fixing it to said first cylinder, a rectangular plate fixed to the top of said further cylinder and extending in generally parallel relation to the floorboard of the automobile, a major portion of said plate extending downwardly away from said further cylinder and having an upturned portion at the lower end thereof, a rectangular pedal of approximately the same size as said plate and in overlying alignment with said plate, a hinge swingably connecting said pedal and plate, a piston reciprocably received through said plate with the opposite ends of the piston engaging said push-button and said pedal, each of said opposite end being enlarged, said resilient means normally urging said piston upwardly to retain said pedal against said upturned portion.

5. With a dimmer switch including a depressable push-button and resilient means yieldably holding said push-button in projected position, said switch being mounted at the floorboard of the automobile with the push-button projecting upwardly and rearwardly in perpendicular relation to the floorboard, and a cylinder housing said push-button and fixed with relation to said floorboard, the improvement which comprises a further cylinder telescoped over said first cylinder, a set screw threadedly received in the wall of said further cylinder and fixing it to said first cylinder, an elongated rectangular plate fixed to the top of said further cylinder and extending in generally parallel relation to the floorboard of the automobile, a major portion of said plate extending downwardly and rearwardly away from said further cylinder and having an upturned portion at the lower end thereof, an elongated rectangular pedal sized approximately the same as said plate and in overlying alignment with said plate, a hinge swingably connecting said pedal and plate centrally thereof, a piston reciprocably received through said plate at the upper forward portion thereof with the opposite ends of the piston engaging said push-button and pedal, each of said opposite ends being enlarged, said resilient means normally urging said pedal upwardly so as to pivot it against said upturned portion.

References Cited in the file of this patent

UNITED STATES PATENTS

| 2,036,099 | Ranlett | Mar. 31, 1936 |
| 2,482,550 | Koertge et al. | Sept. 20, 1949 |
| 2,935,894 | Coronado-Arce | May 19, 1960 |
| 2,984,721 | Wiley et al. | May 16, 1961 |